Figure 1:
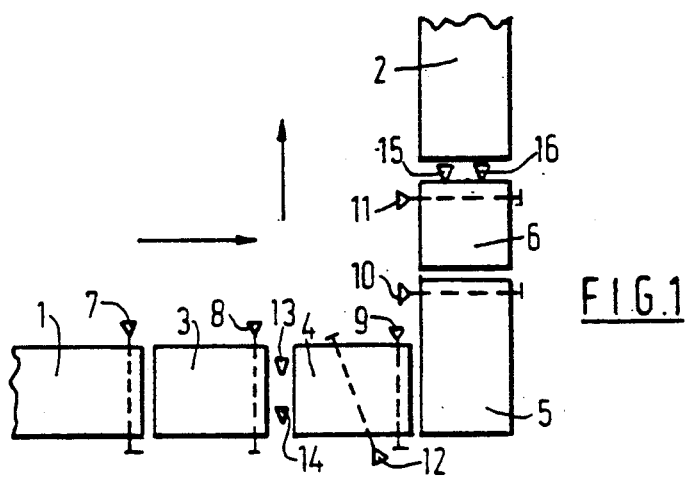

United States Patent [19]

Jones et al.

[11] Patent Number: 5,092,451
[45] Date of Patent: Mar. 3, 1992

[54] METHOD OF AND APPARATUS FOR SEPARATING ARTICLES CONVEYED ON A CONVEYOR SYSTEM

[75] Inventors: Terence Jones, Gomersal; Michael Carter, Harston, both of England

[73] Assignee: Logan Fenamec (UK) Limited, Hull, England

[21] Appl. No.: 251,183

[22] Filed: Sep. 28, 1988

[30] Foreign Application Priority Data

Oct. 1, 1987 [GB] United Kingdom ............... 8723040

[51] Int. Cl.$^5$ ............................................. B65G 43/00
[52] U.S. Cl. ................................................. 198/460
[58] Field of Search .................................... 198/460

[56] References Cited

U.S. PATENT DOCUMENTS

| | | | |
|---|---|---|---|
| 3,251,452 | 5/1966 | Conway et al. | 198/460 |
| 3,485,339 | 12/1969 | Miller et al. | 198/460 |
| 4,227,607 | 10/1980 | Malavenda | 198/460 |
| 4,640,408 | 2/1987 | Eaves | 198/460 |
| 4,717,013 | 1/1988 | Reissmann et al. | 198/460 X |

FOREIGN PATENT DOCUMENTS 133861 11/1978 Japan ................................ 198/460
2045712 11/1980 United Kingdom .

*Primary Examiner*—Robert P. Olszewski
*Assistant Examiner*—Cheryl L. Gastineau
*Attorney, Agent, or Firm*—Charles Berman

[57] ABSTRACT

A method for separating from a group of articles being conveyed along a conveyor system the leading article of the group, wherein the group of articles is conveyed by a first independently operable upstream conveyor (3) towards a second independently operable downstream conveyor (4), and the first conveyor (3) is stopped or reduced in speed relative to the second conveyor (4) after all or a substantial part of the leading article has passed onto the second conveyor (4). This introduces a speed differential between the leading article and the rest of the group and resulting in the leading article being drawn away from the rest of the group. Once the leading article has travelled forward on the second conveyor (4) by a distance sufficient to space it from the rest of the group, the first conveyor (3) is restarted.

50 Claims, 2 Drawing Sheets

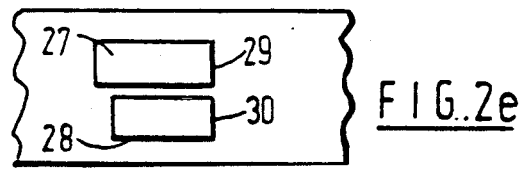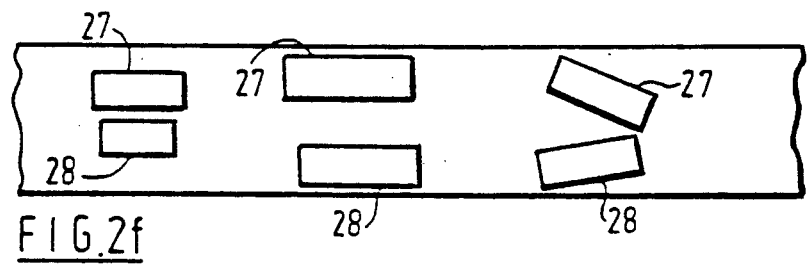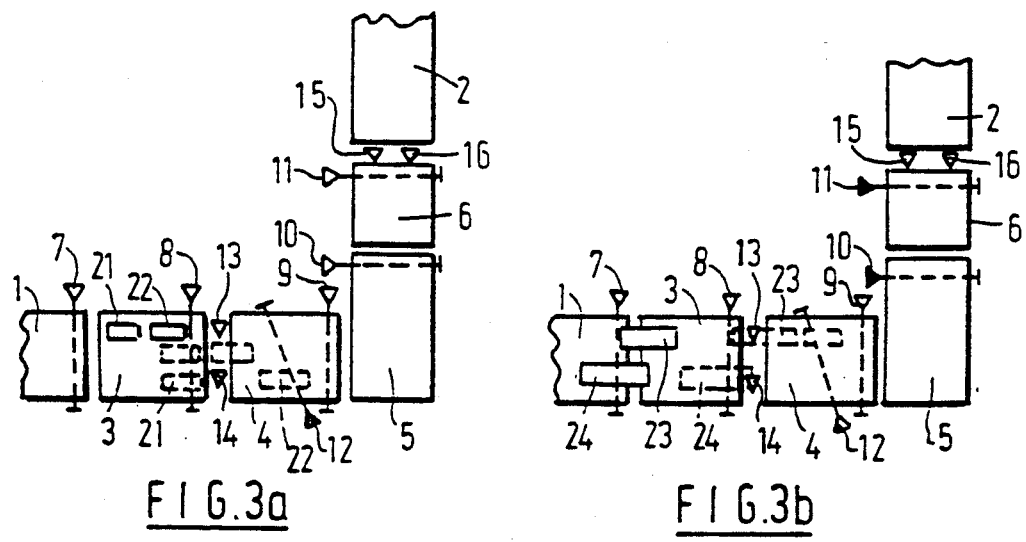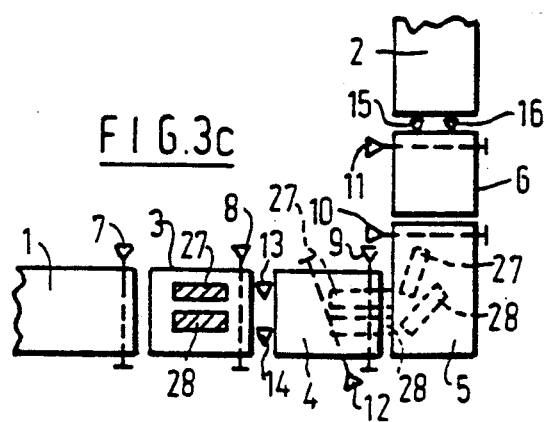

METHOD OF AND APPARATUS FOR SEPARATING ARTICLES CONVEYED ON A CONVEYOR SYSTEM

The present invention relates to a method of and apparatus for separating articles conveyed on a conveyor system into a single, spaced queue. That is to say, articles forming randomly occurring and haphazardly orientated groups of articles on the conveyor system are separated from each other along the length of the conveyor system.

Conveyor systems are widely used to convey articles from one or more collection points to one or more destinations. By way of example, the articles conveyed by conveyor systems may include parcels, components, luggage, etc. It is not unusual for these articles to arrive at the conveyor system in randomly occurring and haphazardly orientated groups. Since this prevents, or at the very least makes difficult, further handling of the articles, it is desirable to provide a system for separating the articles forming each group from each other along the length of the conveyor system. Consider for example a conveyor system carrying items of luggage from a plurality of check in points to a plurality of aircraft loading bays.

Within an airport terminal luggage is usually handed in at a check in point where it is labelled with the intended flight and then passed on to a conveyor system which carries it away to the airports luggage handling facility. It is not unusual for a plurality of check in points to share a common conveyor system and this means that luggage intended for a number of different flights may be loaded onto the conveyor system together and in quite random and haphazard fashion. Each item of luggage conveyed on the conveyor system must be sorted according to its intended flight and this is usually carried out manually, either as the luggage passes along the conveyor system or when it reaches the end of the conveyor system. In either case, it will be readily appreciated that manual sorting of luggage is both time consuming and costly. Furthermore, it is not unknown for luggage to be mis-directed because of the flight labels carried by each item of luggage being mis-read by the baggage handlers. Finally, extensive manual handling of the luggage introduces the possibility of luggage being opened and interfered with.

In order to avoid or, at least, minimise manual handling of luggage, luggage handling systems have been developed which sort the luggage according to their intended flight by reading a machine readable label attached to each item of luggage at the check in points. According to the intended flight indicated by the label each item of luggage is selectively diverted from the conveyor system to an appropriate collection point. Indeed, it is possible for each item of luggage to be loaded directly into the hold of the intended flight. These luggage handling systems are quick and efficient in operation, but rely on the machine readable label carried by each item of luggage being properaly presented to a label reading device. Obviously, where items of luggage are grouped together on the conveyor system the labels can be obscured, and even where the labels are readable it may not be possible to selectively divert a particular item away from the group because other items of luggage lie in its path off the conveyor system. As a consequence, it is desirable to separate from each other the items of luggage on the conveyor system. Gating systems can be used which only allow one item of luggage at a time to pass. However, these are not always reliable because jams of luggage can occur in front of the gate as several items of luggage arrive together. As a consequence, it is not unusual to find some manual sorting of the luggage taking place to ensure that each item of luggage is presented separately to the label reading device.

It is an object of the present invention to provide a method of and apparatus for separating articles conveyed on a conveyor system form each other, thereby forming a single, spaced queue along the length of the conveyor system. It is another object of the present invention to provide a conveyor system comprising apparatus for separating articles conveyed on the conveyor system from each other, thereby forming a single, spaced queue along the length of the conveyor system.

According to a first aspect of the present invention there is provided a method for separating from a group of articles being conveyed along a conveyor system the leading article of the group, wherein the group of articles is conveyed by a first independently operable upstream conveyor towards a second independently operable downstream conveyor, and the first conveyor is stopped or reduced in speed relative to the second conveyor after all, or a substantial part, of the leading article has passed onto the second conveyor, thereby introducing a speed differential between the leading article and the rest of the group and resulting in the leading article being drawn away from the rest of the group.

After a predetermined period of time, corresponding to the minimum distance required between the leading article and the rest of the group has elapsed, the first conveyor may be returned to its normal operating speed relative to the second. Alternatively, the first conveyor may be returned to its normal operating speed relative to the second after the trailing edge of the leading article has passed article sensing means positioned downstream of the transition point between the first and second conveyors.

Preferably, the presence of a leading article amongst a group of articles is determined by comparing the distance between the leading and trailing edges of the group with the maximum expected length of a single article. Should the length of the group exceed the maximum expected length of a single article the presence of a leading article in the group is indicated and article separation can thus be carried out.

Conveniently, the length of a group of articles is determined by scanning the first conveyor width-wise at a point along its path to detect each leading and trailing edge to pass the point, and measuring the length of time which elapses between the detection of each pair of leading and trailing edges. This measure of time corresponds to the length of the group. Preferably, in determining the overall distance between the leading and trailing edges of a group of articles any gap which occurs between the leading articles and the rest of the group, thereby giving rise to a further pair of leading and trailing edges, is ignored unless the length of the gap exceeds the minimum distance required to separate the leading article from the rest of the group. This ensures that where the leading article is separated from the rest of the group, but not by the required distance, article separation takes place. Preferably, the point along the path of the first conveyor at which it is scanned lies at, or immediately adjacent to the transition point between the first and second conveyors. In this position all, or a substantial part of the leading article amongst a group of articles will have passed onto the second conveyor by the time the presence of a leading article has been indicated and article separation can be carried out by stopping or reducing speed of the first conveyor relative to the second to ensure that the leading article is separated from the rest of the group by the required distance.

Advantageously, the difference in distance between the leading edge of the leading article and the leading edge of the rest of the group is determined and this distance is compared with a predetermined measure of length. If the distance between the leading edge is less than the predetermined measure the first conveyor is not stopped or reduced in speed relative to the second to separate the leading article from the rest of the group until the leading edge of the leading article has travelled said predetermined measure beyond the transition point between the first and second conveyor. If, on the other hand, the distance between the leading edges is greater than the predetermined measure the first conveyor is stopped or reduced in speed relative to the second immediately the leading edge of the rest of the group reaches the transition point. Thus, it is possible to ensure that enough of the leading article will always have passed onto the second conveyor to ensure that it is drawn away from the rest of the group, even when the trailing edge of the leading article overlaps with the leading edge of the rest of the group. Preferably, the said predetermined measure of length is equal to at least half the maximum expected length of a single article. Conveniently, the distance between the leading edges is determined by measuring the period of time which elapses between the leading edges being sensed by article sensing means.

According to a second aspect of the present invention there is provided apparatus for separating from a group of articles being conveyed along a conveyor system the leading article of the group, wherein said apparatus comprises sensor means for sensing the presence of a leading article in a group of articles, a first independently operable upstream conveyor, a second independently operable downstream conveyor, and control means whereby the first conveyor is stopped or reduced in speed relative to the second conveyor after all, or a substantial part of the leading article has passed onto the second conveyor, thereby introducing a speed differential between the leading article and the rest of the group and resulting in the leading article being drawn away from the rest of the group. Preferably, the apparatus comprises means for determining the presence of a leading article amongst a group of articles, comprising article sensing means scanning the width of the first conveyor, a timing device for measuring the length of time to elapse between the leading edge and the trailing edge of the group of articles passing said article sensing means, memory means in which is held a predetermined value corresponding to the time taken for a single article of maximum expected length to pass the article sensing means and comparator means for indicating when the measured time exceeds the predetermined value, thereby indicating the presence of a loading article.

Preferably, an offset corresponding to the minimum distance required to separate articles on the conveyor system is added to the predetermined period held in the memory means. Alternatively, the timing device may be set to ignore changes in the output of the article sensing means after the detection of a first leading edge, where these indicate the detection of a trailing edge and then a second leading edge which are not separated from each other by the minimum distance required to separate a leading article from the rest of the group. This ensures that any gap between the trailing edge of the leading article and the leading edge of the rest of the group is ignored, unless it is at least equal to the said required minimum distance, and that article separation is carried out. Preferably, the article sensing means is positioned at, or immediately adjacent to, the transition point between the first and second conveyors.

Advantageously, the apparatus further comprises means for determining the distance between the leading edge of the leading article and the leading edge of the rest of the group, memory means in which is held a predetermined value corresponding to a predetermined measure of length, comparator means for comparing the distance between the leading edges with the predetermined value, and control means responsive to the output of the comparator for controlling the conveyors. If the distance between the leading edges is less than the predetermined measure, the first conveyor is not stopped or reduced in speed relative to the second until the leading edge of leading article has travelled said predetermined measure beyond the transition point between the first and second conveyors. If, on the other hand, the distance between the leading edges is greater than the predetermined measure, the first conveyor is stopped immediately the leading edge of the rest of the group reaches the transition point. Thus, it is possible to ensure that enough of the leading article will always have passed onto the second conveyor to ensure that it is drawn away from the rest of the group when the first conveyor is stopped or reduced in speed relative to the second, even when the trailing edge of the leading article overlaps with the leading edge of the rest of the group.

Preferably, the means for sensing the distance between the leading edge of the leading article and the leading edge of the rest of the group comprises at least two article sensing means positioned side by side across the width of the apparatus, at a point at, or immediately adjacent to the transition point between the first and second conveyors, and a timing device controlled by the outputs of the said at least two article sensing means to measure the length of time to elapse between one of said article sensing means detecting an article and another of said article sensing means detecting an article. Since the article sensing means are responsive to the leading edge of an article, this measured length of time corresponds to the distance between the leading edge of the leading article and the leading edge of the rest of the group. The actual number of article sensing means provided side by side across the width of the apparatus depends, of course, on the width of the apparatus.

Preferably, the predetermined value held in the memory means corresponds to the time taken for at least half of the maximum expected length of a single article to pass the said at least two article sensing means. This period is chosen to ensure that where the trailing edge of the loading article overlaps with the leading edge of the rest of the group, at least half of the leading article is on the second conveyor before the first conveyor is stopped or reduced in speed relative to the second.

Preferably, the articles sensing means each comprise a photoelectric cell positioned opposite a light source. As an article passes between the two the incident light on the photoelectric cell is interrupted, thereby causing a change in output.

Advantageously, the apparatus further comprises a third independently operable conveyor which either conveys articles to the first conveyor or conveys articles from the second conveyor, the direction of travel of which is transverse to that of the first and second conveyors. As two or more articles lying side by side across the path of the apparatus make the transition from either the third conveyor to the first conveyor of from the second conveyor to the third conveyor the distance between their respective leading edges is increased. In this respect, the distance travelled by an article towards the outside edge of the apparatus is greater than that travelled by an article on the inside edge of the apparatus. Conveniently, the third conveyor forms a right angle with either the first conveyor or the second conveyor.

According to a third aspect of the present invention there is provided a conveyor system comprising apparatus in accordance with the first aspect of the present invention, a first conveyor for conveying articles to be separated to the said apparatus and a second conveyor for conveying articles from the said apparatus.

An embodiment of the present invention will now be described, by way of example, with reference to the accompanying drawings, in which;

FIG. 1 shows a schematic partial view of a conveyor system comprising an article separator embodying the present invention;

FIGS. 2(a) to 2(f) illustrate schematically the three basic configurations that articles can adopt on a conveyor system; and FIGS. 3(a) to 3(c) show schematically the operation of the article separator of FIG. 1 which each of the three basic configurations illustrated in FIGS. 2(a) to 2(f).

Referring to FIG. 1 of the accompanying drawings there is shown a conveyor system comprising an article separator embodying the present invention. The article separator itself may be said to comprise that part of the conveyor system between conveyor belts 1 and 2 which are themselves intended to convey articles to and from the article separator. In this respect, the direction of travel of articles conveyed by the conveyor system is indicated by arrows A and articles to be separated are first presented to the article separator from conveyor belt 1. After passing through the article separator the articles are separated from each other and as they are carried away on conveyor belt 2 they form a single, spaced queue along its length.

Further handling of the articles will depend upon the application in which the conveyor system is used. For example, where the conveyor system forms part of a machine sorting system the individual destination of each article on conveyor belt 2 can be read from a machine readable label provided on the article and each article can then be selectively diverted from the conveyor belt 2, or subsequent conveyor belts, to a particular destination, collection point or the like.

The article separator itself comprises a plurality of relatively short conveyor belts of conventional design and construction, each of which is independently driven by drive means (not shown) in the direction of arrows A. Conveyor belts 3 and 4 form a right angle with conveyor belts 5 and 6. As a consequence of this, articles arriving at conveyor belt 5 from conveyor belt 4 will join conveyor belt 5 at different points along its longitudinal length, depending upon the respective positions of each article across the width of conveyor belt 4. The purpose of this arrangement will be described in detail hereinbelow.

Associated with each conveyor belt 1, 3, 4, 5 and 6 is a photocell device 7, 8, 9, 10 and 11, respectively, each of which is positioned at or towards the leading edge of the conveyor belt with which it is associated. Each photocell device scans the width of the conveyor belt with which it is associated to detect the arrival of the leading edge of an article. Conveyor belt 4 is also provided with a further photocell device 12 which scans it obliquely and acts as a differential re-start device for conveyor belt 3, as will be explained in detail hereinbelow. Between conveyor belts 3 and 4 and conveyor belts 6 and 2 there is provided a pair of overhead photocell devices 13 and 14, and 15 and 16, respectively which are arranged side by side across the width of the conveyor belts. The overhead photocell devices comprising each pair, each monitor a respective half of the transition point between the conveyor belts for the arrival of the leading edge of an article. Photocell devices 13 and 15 monitor the inner half of the conveyor belts, and photocell devices 14 and 16 monitor the outer half of the conveyor belts.

The photocell devices 7 to 16 are of conventional design and may conveniently comprise a photoelectric cell and a source of light positioned opposite each other across the region to be monitored. It will be appreciated that as the leading edge of an article passes between the photoelectric cell and its light source, the light source is interrupted and the output of the photoelectric cell changes. Though not shown, the output of each photocell device 7 to 16 is connected to a central controller and this, in turn, controls the drive means for each conveyor belt 1 to 6, as will be described in detail hereinbelow.

Referring now to FIGS. 2(a) to 2(f) there are illustrated schematically the three basic positions which articles on a conveyor system may adopt relative to one another. For simplicity's sake each basic position is demonstrated by pairs of articles. However, it should be appreciated that greater numbers may combine together to form a group and the articles in this group may take up any combination of these three basic positions with respect to one another. The only position not shown in these figures is that where one article lies on top of another. The reason for this is that the articles have been levelled off before reaching the article separator by means of a bar (not shown) which lies upstream of the article separator and across the path of the conveyor system. The use of a bar to level off articles is quite conventional and is, in fact, necessary because articles lying on top of each other are unstable.

Figure 2A:
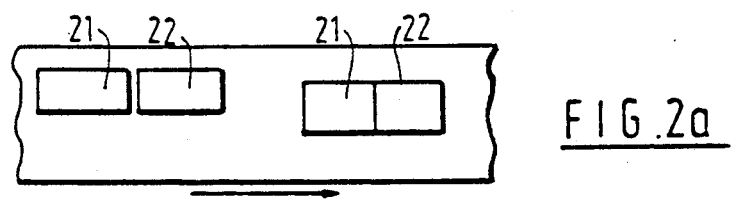
Figure 2B:
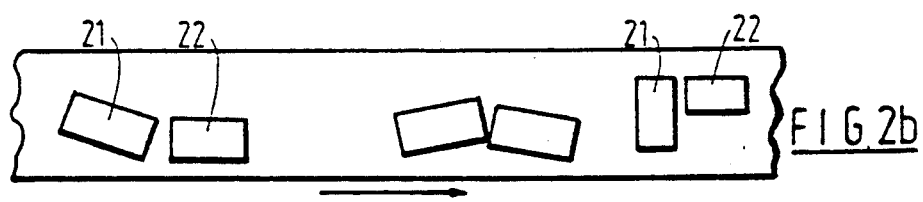

FIGS. 2(a) and (b) show several pairs of articles and in each pair one article 21 is positioned immediately behind the other article 22 so that they are effectively head to tail along the length of the belt. As shown the articles 21 and 22 may be actually touching each other or they may be spaced slightly apart. Of course, where the distance between a spaced pair of articles meets a predetermined minimum then separate leading edges can be discerned for each article by the article separator and no further separation is required. However, where the spacing is less than this predetermined minimum the gap between the two articles is ignored by the article separator and article separation is carried out as will be described hereinbelow. As illustrated in FIG. 2(b) the articles 21 and 22 may adopt a wide variety of positions with respect to each other without departing from the basic position in which the trailing edge of the leading article 22 lies in front of the leading edge of the trailing article 21, though not by sufficient distance for the article 21 and 22 to be considered separate.

Figure 2C:
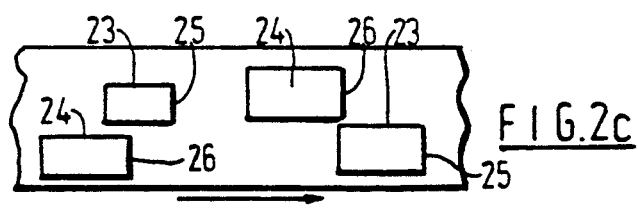
Figure 2D:
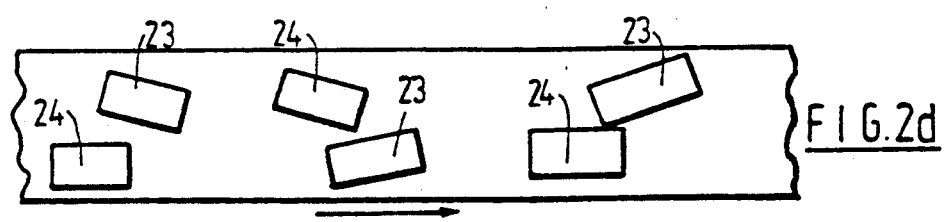

FIGS. 2(c) and 2(d) show a plurality of pairs of articles in each of which one article 23 loads the other article 24 in a longitudinal direction. However, this basic position differs from that of FIGS. 2(a) and 2(b) in that the articles 23 and 24 lie side by side across the width of the conveyor belt in such a way that the trailing edge of leading article 23 overlaps with the leading edge of trailing article 24. The leading article may lie on either the right or left hand side of the conveyor belt and it may or not be touching the trailing article 24. In this basic position it will be appreciated only the leading edge 25 of the leading article 23 can be clearly identified from a point to the side of the conveyor belt and it is, of course, impossible to determine from such a view whether it is the leading edge of an article on the right or left hand side of the conveyor belt. However, by viewing the articles 23 and 24 from above the conveyor belt it is possible to descern which of the two articles is leading the other and whether it lies on the left or right hand side of the conveyor belt. In other words, viewed from overhead both articles 23 and 24 have separately identifiable leading edges 25 and 26 which is not the case for the articles 21 and 22 shown in FIGS. 2(a) and 2(b), and it is this feature which distinguishes one position from the other.

FIGS. 2(e) and (f) show two articles 27 and 28 lying alongside one another across the width of the conveyor belt with no discernable distance between their respective leading edges 29 and 30. Where two or more articles adopt this position it is not possible to distinguish them from a single article when viewed from the side of the conveyor belt or from above the conveyor belt.

Operation of the article separator will now be described with reference to FIGS. 3(a) to 3(c) of the accompanying drawings, each of which illustrates and describes the manner in which the article separator separates articles arranged in each of the three basic positions described with reference to FIGS. 2(a) to 2(f).

Referring now to FIG. 3(a) operation of the article separator to separate articles arranged in the basic article position shown in FIG. 2(a) will be described.

The first conveyor belt in the article separator, that is conveyor belt 3, runs at the same speed as conveyor 1 and therefore there is no change in the relative positions of articles 21 and 22 as they pass from one to the other. As the leading edge of article 22 reaches the junction between conveyor belts 3 and 4 it passes between the photoelectric cell and the light source comprising photocell device 8. This causes a timing device within the central controller (not shown) to begin counting. The timing device is set to ignore any brief change in the output of the photocell device 8, corresponding to a small gap between the two articles 21 and 22, and only if the change is of sufficient duration to signify that the articles 21 and 22 are separated by the required amount will the timing device cease counting to begin again when the leading edge of article 21 reaches it.

If the period of time for which the photocell device 8 is interrupted exceeds a predetermined maximum corresponding to the expected maximum length of a single article plus the minimum accepted article separation between adjacent articles then the central controller turns off or reduces the speed of the drive to conveyor belt 3. Of course, by this time the leading article 22 will have passed fully onto conveyor belt 4 which as it continues to run will carry it forward. However, the lagging article 21 will still be wholly or partially on conveyor belt 3 and will have stopped or slowed down with it. In this way, a gap is developed between the two articles 21 and 22. The size of this gap is determined by the period for which the drive to conveyor belt 3 is turned off or reduced and this period may be preset by a timing device within the central controller, or, alternatively, by the clearance of the trailing edge of article 22 at photocell device 12.

As shown the photocell device 12 scans obliquely across the width of conveyor belt 4 so that a differential restart for conveyor belt 3 is obtained according to the relative position of the article 22 across the width of conveyor belt 4. This differential restart is advantageous in as much as it ensures that a larger gap develops behind an article which has to negotiate the right angle transfer between conveyor belts 4 and 5 from the outside edge of the article separator. As will be readily understood an article making the transfer from the inside edge of the article separator travels a much shorter distance than an article making the transfer from the outside edge and without the differential restart of conveyor belt 3 there would be a tendency for articles on the inside edge to catch up with articles on the outside edge.

As articles 21 and 22 negotiate the remainder of the article separator there is little or no change in their relative positions unless, as indicated above, one lies on the inside edge and the other on the outside edge or a speed differential exists between adjacent pairs of conveyor belts. In any event the article separator operates to ensure that the gap between them is increased rather than decreased.

Should conveyor belt 3 or indeed any of the subsequent conveyor belts be stopped or slowed down to allow a leading article to be drawn away from a lagging article there will of course be a pile up behind the stopped conveyor belt if the belt behind it is not stopped as well. For this reason, photocell devices 7, 8, 9, 10 and 11 all act as queue controllers which ensure that the drive to the conveyor belt with which each is associated is turned off immediately an article arrives at it and the drive to the conveyor belt in front of it has been turned off.

Referring now to FIG. 3(b) operation of the article separator to separate articles arranged in the basic article position shown in FIG. 2(c) will be described.

As articles 23 and 24 pass from conveyor belt 1 to conveyor belt 3 there is, again, no change in their relative positions. Moreover, as the leading edge of article 23 reaches photocell device 8 the overall length of the two articles 23 and 24 together is determined by the timing circuit within the central controller so that if this exceeds the maximum expected length of a single article, article separation takes place as previously described with reference to FIG. 3(a). However, as the leading edge of article 23 passes across the junction between conveyor belts 3 and 4 one or other of the two overhead photocell devices 13 and 14 is interrupted and this provides an indication as to whether it is on the inside half of the article separator or the outside half of the article separator.

If, as shown in FIG. 3(b), the leading article 23 is on the inside half of the article separator photocell 13 is interrupted first and this starts two timing devices within the central controller. The first of these timing devices counts the time taken for the leading edge of the lagging article 24 to reach photocell device 14 and determines whether the two articles 23 and 24 are arranged in the basic article position shown in FIG. 2(c) or in FIG. 2(e). Should the leading edge of the lagging article 24 reach photocell device 14 within a predetermined period set by the first timing device the basic article position shown in FIG. 2(e) is indicated. Otherwise, the basic article position shown in FIG. 2(c) is indicated. The second timer device also counts the time taken for the leading edge of the lagging article 24 to reach the photocell device 14, but is preset with a predetermined period equivalent to the time taken for half the maximum expected length of a single article.

If the leading edge of the lagging article 24 should be detected by photocell device 14 within the predetermined period set by the second timer then upon completion of this predetermined period the drive to conveyor belt 3 is stopped or reduced. If, however, the leading edge of the lagging article 24 should not be detected until after the predetermined period set by the second timer has run out, but before the leading article 23 has cleared photocell device 13 the drive to conveyor belt 3 is stopped or reduced immediately.

It will be seen that the drive to conveyor belt 3 is stopped or reduced only after the leading article 23 is at least half way across the junction between conveyor belts 3 and 4. This is sufficient to ensure that the leading article 23 continues to be drawn forward by conveyor belt 4 whilst the lagging article 24 is stopped or slowed down with conveyor belt 3. Once the leading article 23 is far enough ahead of the lagging article 24 conveyor belt 3 can be restarted or run up to its normal operating speed in the same manner as that previously described with reference to FIG. 3(a).

After passing from conveyor belt 3 to conveyor belt 4 there is little or no change in their relative positions of articles 23 and 24 unless, as previously described above, one lies on the inside edge and the other on the outside edge or a speed differential exists between adjacent pairs of conveyor belts. In any event, the article separator operates to ensure that the gap between them is increased rather than decreased.

Referring now to FIG. 3(c) operation of the article separator to separate articles arranged in the basic article position shown in FIG. 2(e) will be described.

As will be appreciated from the explanation given hereinabove with reference to FIG. 3(b) where the leading edges to two articles 27 and 28 are effectively neck and neck there will be no change in their relative positions as they pass from conveyor belt 1 to conveyor belt 3, or from conveyor belt 3 to conveyor belt 4. However, when the two articles 27 and 28 come to negotiate the transition between conveyor belts 4 and 5 article 27 on the inside half of the article separator will move forward, ahead of article 28 on the outside half of the article separator because of the shorter path which it takes. Depending on the length of the two articles 27 and 28, and the distance by which they are spaced across the width of conveyor belt 4 the transition between conveyor belts 4 and 5 will change the basic article configuration the articles take from that shown in FIG. 2(e) to either that shown in FIG. 2(a) or more probably that shown in FIG. 2(c).

As the articles 27 and 28 move forward from conveyor belt 5 to conveyor belt 6 they are separated fully from each other in the same manner as previously described hereinabove with reference to FIG. 3(a) or FIG. 3(b).

Although the operation of the article separator described hereinabove has only been illustrated and described with reference to pairs of articles it will be readily appreciated that the mode of operation also applies to larger groups of articles in exactly the same way. In this respect, each group of articles is effectively treated as a single pair of articles comprising a leading and a lagging article. Once the leading article has been separated from the lagging article the lagging article becomes the leading article and the next article becomes the lagging article. In the event that three or more articles should arrive at the article separator neck and neck the right angled transition between conveyor belts ensures that a distinguishable lead and lag is introduced between each adjacent pair and thereafter separation proceeds as before.

The article separator is particularly suited for use with a machine sorting system in separating items of luggage on a conveyor system between a plurality of check-in points and a plurality of specific destinations. However, it may equally well be applied to conveyor systems carrying parcels, components or the like, and it can be used with or without a machine sorting system.

We claim:

1. A method for separating from a group of articles being conveyed along a conveyor system, the leading article of the group, wherein the group of articles is conveyed by a first independently operable upstream conveyor towards a second independently operable downstream conveyor and the first conveyor is reduced in speed relative to the second conveyor after a substantial part of the leading article has passed onto the second conveyor, thereby introducing a speed differential between the leading article and the rest of the group and resulting in the leading article being drawn away from the rest of the group, wherein after a predetermined period of time, corresponding to the minimum distance required between the leading article and the rest of the group has elapsed, the first conveyor is returned to its normal operating speed relative to the second, wherein the presence of a leading article amongst a group of articles is determined by comparing the distance between the leading and trailing edges of the group with the maximum expected length of a single article, and wherein the distance between the leading and trailing edges of a group of articles is determined by scanning the first conveyor width-wise at a point along its path to detect each leading and trailing edge to pass the point, and measuring the length of time which elapses between the detection of each pair of leading and trailing edges.

2. A method according to claim 1 wherein any gap which occurs between the leading article and the rest of the group is ignored unless the length of the gap exceeds the minimum distance required to separate the leading article from the rest of the group.

3. A method according to claim 1, wherein the poing along the path of the first conveyor at which it is scanned lies in the vicinity of the transition point between the first and second conveyors.

4. A method for separating from a group of articles being conveyed along a conveyor system, the leading article of the group, wherein the group of articles is conveyed by a first independently operable upstream conveyor towards a second independently operable downstream conveyor and the first conveyor is reduced in speed relative to the second conveyor after a substantial part of the leading article has passed onto the second conveyor, thereby introducing a speed differential between the leading article and the rest of the group and resulting in the leading article being drawn away from the rest of the group, wherein after a predetermined period of time, corresponding to the minimum distance required between the leading article and the rest of the group has elapsed, the first conveyor is returned to its normal operating speed relative to the second, wherein the difference in distance between the leading edge of the leading article and the leading edge of the rest of the group is determined and this distance is compared with a predetermined measure of length, and wherein when the distance between the leading edges is less than the predetermined measure, the first conveyor is not reduced in speed relative to the second until the leading edge of the leading article has travelled said predetermined measure beyond the transition point between the first and second conveyors.

5. A method according to claim 4, wherein when the distance between the leading edge is greater than the predetermined measure, the first conveyor is reduced in speed relative to the second immediately when the leading edge of the rest of the group reaches the transition point.

6. A method according to claim 4, wherein the said predetermined measure of length is equal to at least half of the maximum expected length of a single article.

7. A method according to claim 4, wherein the distance between the leading edges is determined by measuring the period of time which elapses between the leading edges being sensed by article sensing means.

8. A method according to claim 7, wherein the leading edges of the leading article and the rest of the group are sensed in the vicinity of the transition point between the first and second conveyors.

9. Apparatus for separating from a group of articles being conveyed along a conveyor system the leading article of the group wherein said apparatus comprises sensor means for sensing the presence of a leading article in a group of articles, a first independently operable upstream conveyor, a second independently operable downstream conveyor, and control means whereby the first conveyor is reduced in speed relative to the second conveyor after a substantial part of the leading article has passed onto the second conveyor, thereby introducing a speed differential between the leading article and the rest of the group and resulting in the leading article being drawn away from the rest of the group wherein said means for sensing the presence of a leading article amongst a group of articles, comprises article sensing means scanning the width of the first conveyor, a timing device for measuring the length of time to elapse between the leading edge and the trailing edge of a group of articles passing said article sensing means, memory means in which is held a predetermined value corresponding to the time taken for a single article of maximum expected length to pass the article sensing means and comparator means for indicating when the measured time exceeds the predetermined value, thereby indicating the presence of a leading article.

10. Apparatus according to claim 9, wherein an offset corresponding to the minimum distance required to separate articles on the conveyer system is added to the predetermined period held in the memory means.

11. Apparatus according to claim 9, wherein the timing device is set to ignore changes in the output of the article sensing means after the detection of a first leading edge, where these indicate the detection of a trailing edge and then a second leading edge which are not separated from each other by the minimum distance required to separate a leading article from the rest of the group.

12. Apparatus according to claim 9, wherein the article sensing means is positioned in the vicinity of the transition point between the first and second conveyors.

13. Apparatus according to claim 9, wherein the apparatus further comprises means for determining the distance between the leading edge of the leading article and the leading edge of the rest of the group, memory means in which is held a predetermined value corresponding to a predetermined measure of length, comparator means for comparing the distance between the leading edges with the predetermined value, and control means responsive to the output of the comparator for controlling the conveyors.

14. Apparatus according to claim 13, wherein the means for sensing the distance between the leading edge of the leading article and the leading edge of the rest of the group comprises at least two article sensing means positioned side by side across the width of the apparatus, at a point in the vicinity of the transition point between the first and second conveyors and a timing device controlled by the outputs of the said at least two article sensing means to measure the length of time to elapse between one of said article sensing means detecting an article and another of said article sensing means detecting an article.

15. Apparatus according to claim 14, wherein the predetermined value held in the memory means corresponds to the time taken for at least half of the maximum expected length of a single article to pass the said at least two article sensing means.

16. Apparatus according to claim 9 or claim 14, wherein the articles sensing means each comprise a photoelectric cell positioned opposite a light source.

17. Apparatus according to claim 9, wherein the apparatus further comprises a third independently operable conveyor which conveys articles to the first conveyor, the direction of travel of which is transverse to that of the first and second conveyors.

18. Apparatus according to claim 9, wherein the apparatus further comprises a third independently operable conveyor which conveys articles from the second conveyor, the direction of travel of which is transverse to that of the first and second conveyors.

19. A conveyor system, comprising:
(a) apparatus for separating from a group of articles being conveyed along a conveyor system the leading article of the group wherein said apparatus comprises sensor means for sensing the presence of a leading article in a group of articles, a first independently operable upstream conveyor, a second independently operable downstream conveyor, and control means whereby the first conveyor is reduced in speed relative to the second conveyor after a substantial part of the leading article has passed onto the second conveyor, thereby introducing a speed differential between the leading article and the rest of the group and resulting in the leading article being drawn away from the rest of the group wherein said means for sensing the presence of a leading article amongst a group of articles, comprises article sensing means scanning the width of the first conveyor, a timing device for measuring the length of time to elapse between the leading edge and the trailing edge of a group of articles passing said article sensing means memory means in which is held a predetermined value corresponding to the time taken for a single article of maximum expected length to pass the article sensing means and comparator means for indicating when the measured time exceeds the predetermined value, thereby indicating the presence of a leading article;

(b) an additional conveyor for conveying groups of articles to be separated from each other to the said apparatus; and (c) a further conveyor for conveying articles from the said apparatus.

20. A method for separating the leading article from a group of randomly presented articles being conveyed by a first independently operable upstream conveyor towards a second independently operable downstream conveyor, wherein (a) when the trailing edge of the leading article overlaps with the leading edge of the rest of the group the distance between the leading edge of the leading article and the leading edge of the rest of the group is compared with a first predetermined measure of length and the first conveyor is reduced in speed relative to the second conveyor when the leading edge of the leading article has travelled forward beyond the transition point between the first and second conveyors by a distance which is at least equal to said first predetermined measure of length; and (b) when there is no discernible overlap between the trailing edge of the leading article and the leading edge of the leading article, and the length of the group of articles is determined to exceed a second predetermined measure of length, the first conveyor is reduced in speed relative to the second conveyor when the leading edge of the group has travelled forward beyond the transition point between the first and second conveyors by a distance which is equal to said second predetermined measure of length.

21. A method according to claim 20, wherein after a predetermined period of time, corresponding to the minimum distance required between the leading article and the rest of the group, has elapsed, the first conveyor is returned to its normal operating speed relative to the second.

22. A method according to claim 20, wherein the first conveyor is returned to its normal operating speed relative to the second after the trailing edge of the leading article has passed article sensing means positioned downstream of the transition point between the first and second conveyors.

23. A method according to claim 22, wherein the article sensing means scans the belt obliquely, thereby giving rise to a differential restart for the first conveyor according to the position of the leading article across the width of the second belt.

24. A method according to claim 20, wherein the second predetermined measure of length is equal to the maximum expected length of a single article.

25. A method according to claim 24, wherein the length of the group of articles is determined by scanning the first conveyor width-wise at a point along its path to detect each leading and trailing edge to pass the point, and measuring the length of time which elapses between the detection of each pair of leading and trailing edges.

26. A method according to claim 24, wherein any gap which occurs between the trailing edge of the leading article and the leading edge of the rest of the group, is ignored unless the length of the gap exceeds the minimum distance required to separate the leading article from the rest of the group.

27. A method according to claim 25 or 26, wherein the point along the path of the first conveyor at which it is scanned lies at, or immediately adjacent to, the transition point between the first and second conveyors.

28. A method according to claim 20, wherein when the distance between the leading edge of the leading article and the leading edge of the rest of the group is less than the first predetermined measure the first conveyor is not stopped or reduced in speed relative to the second until the leading edge of the leading article has travelled said first predetermined measure beyond the transition point between the first and second conveyors.

29. A method according to claim 20, wherein when the distance between the leading edge of the leading article and the leading edge of the rest of the group is greater than the first predetermined measure the first conveyor is stopped or reduced in speed relative to the second immediately the leading edge of the rest of the group reaches the transition point between the first and second conveyors.

30. A method according to claim 20, wherein the said first predetermined measure of length is equal to half of the maximum expected length of a single article.

31. A method according to claim 20, wherein the distance between the leading edge of the leading article and the leading edge of the rest of the group is determined by measuring the period of time which elapses between the leading edges being sensed by article sensing means.

32. A method according to claim 20, wherein the leading edge of the leading article and the leading edge of the rest of the group are sensed at or immediately adjacent to the transition point between the first and second conveyors.

33. A method according to claim 20, wherein a difference in distance is introduced between the leading edge of a first article lying level with the leading edge of a second article, by conveying the first and second articles to the said first independently operable upstream conveyor by means of a third independently operable conveyor, the direction of travel of which is transverse to that of the said first conveyor.

34. A method for separating from a group of randomly presented articles being conveyed by a first independently operable upstream conveyor toward a second independently operable downstream conveyor the leading article of the group, wherein the first conveyor is reduced in speed relative to the second conveyor when the distance between the leading and trailing edges of the group is determined to exceed a predetermined measure of length, corresponding to the maximum expected length of a single article, and the leading edge of the group has travelled forward beyond the transition point between the first and second conveyors by a distance substantially equal to said predetermined measure of distance.

35. A method for separating from a group of randomly presented articles being conveyed by a first independently operable upstream conveyor toward a second independently operable downstream conveyor the leading article of the group, wherein the difference in distance between the leading edge of the leading article and the leading edge of the rest of the group is determined and this distance is compared with a predetermined measure of length and the first conveyor is reduced in speed relative to the second conveyor only after the leading edge of the leading article has travelled forward beyond the transition point between the first and second conveyors by a distance which is at least equal to said predetermined measure of length.

36. Apparatus for separating the leading article from a group of articles being conveyed along a conveyor system, wherein said apparatus comprises a first independently operable upstream conveyor, a second independently operable downstream conveyor, first article sensing means capable of determining the distance between the leading edge of a leading article and the leading edge of the rest of the group of articles, where the leading edge of the rest of the group of articles overlaps with the trailing edge of the leading article, first comparator means for comparing the said distance with a first predetermined measure of length, second article sensing means capable of determining the distance between the leading edge and the trailing edge of a single article or group of articles being conveyed along the first conveyor, second comparator means for comparing the said distance with a second predetermined measure of length, and control means whereby the first conveyor is stopped or reduced in speed relative to the second conveyor when the leading edge of a leading article, the trailing edge of which overlaps with the leading edge of the rest of the group, has travelled forward beyond the transition point between the first and second conveyors by a distance which is equal to said first predetermined measure of length, and when the leading edge of a group of articles has travelled forward beyond the transition point between the first and second conveyors by a distance which is equal to said second predetermined measure of length.

37. Apparatus according to claim 36, wherein the said first predetermined measure of length is equal to half the maximum expected length of a single article.

38. Apparatus according to claim 36, wherein the first article sensing means comprises at least two article sensors positioned side-by-side across the width of the apparatus, and a timing device controlled by the outputs of the said at least two article sensors to determine the length of time to elapse between one of the article sensors detecting an article and the other article sensor detecting an article.

39. Apparatus according to claim 36, wherein the second article sensing means comprises an article sensor scanning the width of the first conveyor, and a timing device for measuring the length of time to elapse between the leading edge and the trailing edge of a single article or group of articles to pass the article sensor.

40. Apparatus according to claim 39, wherein the timer device is set to ignore changes in the output of the article sensor after the detection of a first leading edge, where these indicate the detection of a trailing edge and then a second leading edge which are not separated from each other by the minimum distance required to separate a leading article from the rest of the group.

41. Apparatus according to claim 36, wherein the second predetermined measure of length is equal to the maximum expected length of a single article.

42. Apparatus according to claim 36, wherein the article sensor is positioned at, or immediately adjacent to, the transition point between the first and second conveyors.

43. Apparatus according to claim 37 or claim 39, wherein the article sensors each comprise a photoelectric cell positioned opposite a light source.

44. Apparatus according to claim 36, wherein the apparatus further comprises a third independently operable conveyor which conveys articles to the first conveyor, the direction of travel of which is transverse to that of the first and second conveyors.

45. Apparatus according to claim 36, wherein the apparatus further comprises a third independently operable conveyor which conveys articles from the second conveyor, the direction of travel of which is transverse to that of the first and second conveyors.

46. Apparatus according to claim 36, wherein article sensing means is positioned downstream of the transition point between the first and second conveyors, which article sensing means controls the return to normal operating speed of the first conveyor.

47. Apparatus according to claim 46, wherein the article sensing means scans obliquely across the width of the belt, thereby giving rise to a differential restart of the first conveyor according to the position of the article across the width of the second conveyor.

48. A conveyor system comprising:
 (a) an apparatus for separating the leading article from a group of articles being conveyed along a conveyor system, wherein said apparatus comprises a first independently operable upstream conveyor, a second independently operable downstream conveyor, first article sensing means capable of determining the distance between the leading edge of a leading article and the leading edge of the rest of the group of articles, where the leading edge of the rest of the group of articles overlaps with the trailing edge of the leading article, first comparator means for comparing the said distance with a first predetemined measure of length, second article sensing means capable of determining the distance between the leading edge and the trailing edge of a single article or group of articles being conveyed along the first conveyor, second comparator means for comparing the said distance with a second predetermined measure of length, and control means whereby the first conveyor is stopped or reduced in speed relative to the second conveyor when the leading edge of a leading article, the trailing edge of which overlaps with the leading edge of the rest of the group, has travelled forward beyond the transition point between the first and second conveyors by a distance which is equal to said first predetermined measure of length, and when the leading edge of a group of articles has travelled forward beyond the transition point between the first and second conveyors by a distance which is equal to said second predetermined measure of length;
 (b) an additional conveyor for conveying groups of articles to be separated from each other to the said apparatus; and
 (c) a further conveyor for conveying articles from the said apparatus.

49. Apparatus for separating the leading article from a group of articles being conveyed along a conveyor system, wherein said apparatus comprises a first independently operable upstream conveyor, a second independently operable downstream conveyor, article sensing means capable of determining the distance between the leading edge of a leading article and the leading edge of the rest of the group of articles, where the leading edge of the rest of the group of articles overlaps with the trailing edge of the leading article, comparator means for comparing the said distance with a first predetermined measure of length, and control means whereby the first conveyor is stopped or reduced in speed relative to the second conveyor when the leading edge of a leading article, the trailing edge of which overlaps with the leading edge of the rest of the group, has travelled forward beyond the transition point between the first and second conveyors by a distance which is, at least, equal to said first predetermined measure of length.

50. Apparatus for separating the leading article from a group of articles being conveyed along a conveyor system, wherein said apparatus comprises a first independently operable downstream conveyor, article sensing means capable of determining the distance between the leading edge and the trailing edge of a single article or group of articles being conveyed along the first conveyor, comparator means for comparing the said distance with a second predetermined measure of length, and control means whereby the first conveyor is stopped or reduced in speed relative to the second conveyor when the leading edge of a group of articles has travelled forward beyond the transition point between the first and second conveyors by a distance which is, at least, equal to said second predetermined measure of length.

* * * * *